Patented July 19, 1949

2,476,424

UNITED STATES PATENT OFFICE 2,476,424

PROCESS FOR THE MANUFACTURE OF 5,6-UNSATURATED-7-HALOGENO - STEROIDS AND 5,6 - UNSATURATED - 7 - DEHYDRO - STEROIDS

Albert Lowenbein, London, England

No Drawing. Application February 26, 1946, Serial No. 650,378. In Great Britain November 9, 1945

14 Claims. (Cl. 260—397.2)

This invention relates to a process for the manufacture of 5,6-unsaturated-7-halogeno-steroids and 5,6-unsaturated-7-dehydro-steroids.

It is known that certain 7-dehydro-sterols are valuable provitamins and may be converted by activation into vitamin D. Prominent in biological importance among them is 7-dehydro-cholesterol, the precursor of the natural vitamin D and the prevalent provitamin of man and higher animals. As the parent compound it generally accompanies vitamin D in vertebrates and although widespread in such species and in the nutriments produced by them, its minute concentration in these sources makes it extremely difficult to separate this valuable provitamin from the bulk of related materials and to obtain it in a purified state.

7-dehydro-cholesterol and other related 7-dehydrosterols have been prepared by chemical processes, which are subject to many disadvantages, such as the difficulty of controlling the reaction during the numerous steps involved, formation of undesired by-products in side reactions, etc.

It is an object of the present invention to overcome the aforementioned and other disadvantages and to provide a more efficient chemical process for the conversion of cholesterol into 7-dehydro-cholesterol with an almost theoretical yield and high degree of purity of this provitamin.

K. Ziegler et al. (Annalen der Chemie, 551, 102, (1942)) have described the use of N-bromsuccinimide and related compounds for the halogenation of unsaturated organic compounds in the allyl position, i. e. for halogen substitution on a carbon atom adjacent to a double bond. Numerous examples of this reaction, in which chlorine or bromine is the substituent, are given, with exact descriptions of the conditions and technique. In many cases the halogenation is followed by dehydrohalogenation of the halogen derivatives, generally using quinoline for this purpose, to produce compounds with two or more conjugated double bonds. It is stated that the esters of cholesterol can be brominated very easily within a few minutes using N-bromosuccinimide. The authors state that they are dealing with a plain substitution because of the quantitative recovery of succinimide. However, the authors did not report the isolation of the brominated sterol ester, nor has the halogenated product been characterized by its properties.

If the halogen substitution is carried out with unsaturated hydrocarbons having a certain degree of molecular symmetry, e. g. cyclohexene, the product of the monosubstitution will be identical, no matter which carbon atom of the two in the vicinity of the double bond is involved in the reaction. However, the esters of cholesterol do not exhibit such symmetry and consequently different halogenated products could be formed according to the course of the substitution reaction. As the 4-carbon atom and the 7-carbon atom are both adjacent to the existing 5-6 double bond, in the case of a monobromosubstitution the formation of a 4-bromo-cholesterol ester and of a 7-bromo-cholesterol ester might be expected, or a mixture of these isomers, if both carbon atoms react.

My preliminary investigation of the product of bromination of cholesterol acetate with N-bromosuccinimide gave misleading results. Although it was not possible at that time to isolate the halogenated sterol ester in a crystalline state, it was believed that an investigation of the product obtained after dehydrobromination could furnish the desired information about the place of the original entry of the halogen into the sterol molecule. Such a dehydrobromination was effected by the reaction of the halogenated compound with tertiary amines, particularly dialkyl-anilines or quinoline, and produced ultimately a mixture of doubly unsaturated sterols containing a certain proportion of 7-dehydro-cholesterol. Considering that a monohalogenated sterol ester has the delicate structure of a cyclic allyl halogenide and as such is very susceptible to an anionotropic rearrangement during chemical reactions, these results of dehydrobromination cannot give a clear answer to the question of the original location of the halogen. Only if the halogenated product could be isolated in a purified and crystalline state and moreover a method of dehydrobromination found and applied to it which did not involve a molecular rearrangement of the originally formed allyl derivative, could the course of the halogenation be proved satisfactorily. The present invention provides the attainment of both these requirements.

It has now been found according to this invention that it is possible to obtain the product of bromination of cholesterol acetate by means of N-bromosuccinimide in a purified and crystalline state by carrying out the reaction in the presence of finely divided calcium oxide or calcium hydroxide or calcium carbonate or other alkaline earth oxide or hydroxide or carbonate as basic adsorbent and by subsequently removing the solvent in the presence of a small proportion of pyridine as a protective and stabilizing agent.

In order to isolate the crystalline bromo-cholesterol acetate it has been found necessary to remove thoroughly small amounts of petroleum ether, used originally as a diluent in the bromination and retained stubbornly by the residue, which can be achieved by repeatedly dissolving it in acetone and removing the solvent at room temperature under reduced pressure. The presence of a small proportion of pyridine or other tertiary organic base is required during this operation to prevent a formation of free hydrobromic acid and a destruction of the desired compound thereby. After this treatment the residue becomes easily crystalline by cooling and digesting with acetone.

As this bromo-cholesterol acetate could be almost completely converted into 7-dehydro-cholesterol by using a novel method of dehydrobromination, to be described later, it can be regarded as 7-bromo-cholesterol acetate. It forms colourless crystals of melting point 84 to 85° C., it is easily soluble in ether, acetone and hydrocarbons, sensitive to acids, and decomposes immediately with methyl alcohol or ethyl alcohol with liberation of hydrobromic acid, the volumetric determination of which gives a value calculated for a monobromo-cholesterol acetate. The amount of mobile bromine in the 7-bromo-cholesterol acetate has been further determined by dehydrobrominating it with diethyl-aniline; it yielded 95% of the theoretical amount (calculated for a monobromide) of diethyl-aniline hydrobromide.

An important feature of the invention is the use of an unsaturated hydrocarbon, such as cyclohexene, to activate the reaction between a halogenated acid imide and a steroid compound.

It has been observed that purified cholesterol acetate, when reacted in a petroleum ether (60/80° C.) solution with N-bromosuccinimide, shows a certain and often quite irregular degree of passivity. At a concentration and temperature, as illustrated in Example 1 below, it might take 15 to 20 minutes and longer until the desired reaction sets in. If a basic adsorbent such as finely divided calcium oxide or calcium hydroxide is added to the reaction mixture, the time of the reaction appears to be reduced. If cholesterol acetate is reacted in petroleum ether solution with N-bromosuccinimide at the same temperature and concentration as described in Example 1, but in the presence of finely divided calcium hydroxide or calcium oxide (about ⅕th of weight of the amount of N-bromosuccinimide used), the reaction takes generally a more regular course and may be finished in 10 to 12 minutes. According to the present invention the reaction between cholesterol acetate and N-bromosuccinimide can be activated by the addition of a small proportion of an activating agent such as an unsaturated hydrocarbon, preferably cyclohexene. As illustrated in Example 1, cyclohexene employed in a concentration of less than 1%, acts as an activating agent, resulting in an almost immediate start of the reaction on boiling, and in its completion within 5 minutes. By carrying out the reaction with the exclusion of moisture this rapid rate of bromination in the presence of a small proportion of cyclohexene can be secured equally with and without the use of calcium oxide or calcium hydroxide. It is known that cyclohexene reacts, as such, with N-bromosuccinimide, although slowly, particularly in a great dilution, as applied above. By closer investigation of the chemical mechanism of the aforesaid activation, I have found that cyclohexene is involved in the halogenation to a much greater extent than is the case when cyclohexene is reacted under otherwise similar conditions, but in the absence of the sterol ester. This indicates that the halogenation of cyclohexene and sterol ester are mutually propagated and that the activation can be regarded therefore as an initiation of a chain reaction.

It is significant that the presence of such a small proportion of cyclohexene as that employed in Example 1 initiates and accelerates the reaction between cholesterol acetate and N-bromosuccinimide in lower boiling solvents, such as ether or petroleum ether (50/60° C.), considerably. In other words, the use of a small proportion of cyclohexene can provide a regular control of the halogenating process, it can secure a relatively rapid rate of the reaction and a more effective utilisation of the halogenating agent, in accordance with the invention. At the same time undesirable side reactions are reduced or repressed.

It is among the objects of this invention to provide a novel process of preparing 7-dehydro-cholesterol or analogous 7-dehydro derivatives of steroids by dehydrobrominating 7-bromo-cholesterol acetate or analogous halogenated steroids with an inorganic base, preferably an alkaline earth metal base such as calcium hydroxide in an inert medium, whereby higher yields of the desired end product are secured, while at the same time, by preventing undesired side reactions during the process, a greater purity of 7-dehydro-cholesterol or analogous 7-dehydro-steroid derivative is obtained.

Recently a method of dehydrobromination of brominated esters of cholesterol has been described with an organic base, particularly diethyl-aniline and dimethyl-aniline as a dehydrobrominating agent, which leads to a mixture of 7-dehydro-cholesterol contaminated with a considerable amount of other unsaturated steroids. The treatment of the brominated cholesterol ester with the tertiary amine has been carried out in a homogeneous medium which retained in solution the hydrobromide of the organic base formed during the reaction. As such solutions are ionized to a certain degree, and ions, particularly cations, are known to influence catalytically the anionotropic rearrangement of allyl derivatives, a continuous destruction of the starting material takes place, which explains the formation of undesired by-products by lowering the yield and purity of the 7-dehydrocholesterol. As such steroid mixtures are difficult to separate, large amounts of impurities are for technical use a serious handicap.

I have found that a much faster and more selective dehydrobromination can be carried out and that the yields and purity are increased considerably, if the dehydrobromination is effected by a suitable inorganic base, particularly a hydroxide or an oxide of an alkaline earth. The reaction is carried out in an inert, anhydrous, preferably well-agitated medium and is completed in a short time at a temperature preferably of about 120° C. Purified 7-bromo-cholesterol acetate has been subjected to dehydrobromination both with diethyl-aniline and by using calcium hydroxide, as described in the present invention. Whereas the former method produced the usual mixture of 7-dehydro-cholesterol with a considerable proportion of isomeric steroids, the novel process yielded almost the theoretical amount of 7-dehydro-cholesterol with a high degree of purity. It may be of some theoretical interest to note that this dehydrobromination takes place on the surface of the finely divided inorganic base, which is a rich source of hydroxyl anions. There is reason to conclude that the reaction is initiated by a transfer of a proton from the carbon atom in the 8-position being attracted by hydroxyl ions of the inorganic base. The new double bond in the 7,8-position is then established by elimination of the bromine from the 7-position in form of a bromine-anion, joining up with the cationic charge, caused previously by the acceptance of the proton by the inorganic base, e. g.:

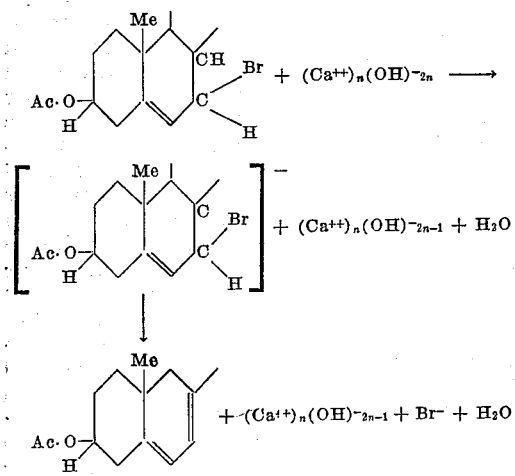

According to this reaction scheme, the reaction proceeds without mobile cationic particles in the solution and therefore the anionotropic rearrangement of the 7-bromo compound is greatly reduced or repressed, which secures the uniformity of the reaction leading to the 7-dehydro-cholesterol derivative, as the desired end product. That this reaction is closely linked up with the concentration of hydroxyl ions on the surface of the inorganic base can be illustrated further by the fact that the hydroxides of the alkaline earths are better than the corresponding oxides and that they cannot be replaced successfully by the corresponding carbonates. On the other hand it appears to be of advantage to carry out the dehydrobromination of the 7-bromo-compound with an alkaline earth hydroxide in the presence of an inert diluent with a high dielectric constant, such as nitrobenzene, to facilitate the proton transfer.

Based upon the above discoveries the present invention provides a process for the manufacture of 7-halogeno-steroids wherein a 5,6-unsaturated steroid, preferably cholesterol acetate, is halogenated, preferably brominated, by treatment with an N-halogenated acid imide or an N-halogenated acid amide, preferably an N-brominated acid imide, e. g. N-bromosuccinimide or N-bromophthalimide in an inert solvent in the presence of a small proportion of an activator, preferably cyclohexene.

Preferably the process is carried out in the presence of a basic adsorbent.

Furthermore, the present invention includes the isolation of the new crystalline compound 7-bromo-cholesterol acetate having a melting point of 84 to 85° C. by removing the solvent from the product obtained in the above-described process in the presence of pyridine or other tertiary organic base.

Furthermore, the present invention also provides a process for the manufacture of 7-dehydro derivatives of steroids, particularly 7-dehydrocholesterol esters, wherein a 5,6-unsaturated 7-halogeno-steroid, or a reaction mixture containing the same, is reacted with an inorganic base such as an alkaline earth metal base preferably an oxide, or hydroxide, of an alkaline earth metal.

A very important advantage of the process of the present invention is that the formation of undesirable by-products, as obtained in the processes previously employed, is greatly reduced or repressed and that the yields and purity of the 5,6-unsaturated 7-dehydro-sterol esters or the like are considerably increased.

On hydrolysis the corresponding 7-dehydrosteroids can be obtained. When an ester of cholesterol is used as a starting material this process enables the preparation of the provitamin of the natural vitamin-D to be effected in high yield and a high degree of purity.

The conversion of the halogenated steroid into the 5,6-unsaturated 7-dehydro-steroid derivative can be carried out both with and without the previous isolation of the halogenated product.

The most effective conditions which have been found according to the invention of carrying out the dehydrohalogenation of the halogenated sterol derivatives, are to treat the preferably well-agitated solution of the halogen compound in xylene or other inert solvent with a suitable excess of finely divided hydroxide or oxide of an alkaline earth metal at a temperature of about 120° C. for 10 to 15 minutes. It is preferable further to add during or before the reaction a suitable proportion of an inert diluent with a high dielectric constant, such as nitrobenzene. The high boiling solvents can be removed by distillation with steam or under reduced pressure. It appears to be desirable, particularly if distillation with steam is employed, to add previously to the preferably filtered solution a suitable amount of sodium carbonate. The 5,6-unsaturated 7-dehydro-sterol-ester remains in the residue and gives the 5,6-unsaturated 7-dehydro-sterol on hydrolysis.

The following examples illustrate how the process of the invention may be carried into effect:

1. 28 gms. of cholesterol acetate is dissolved in 125 ml. of petroleum ether (B. Pt. 60/80° C.) and 0.8 ml. of cyclohexene. A mixture of 17 gms. of N-bromosuccinimide with 5 gms. of finely divided calcium hydroxide is added and warmed with stirring and refluxing. The vigorous reaction is finished within 5 minutes. The slightly yellow solution is separated from the solid residue, which shows a reduction in weight of about 6 gms. The solution is concentrated under reduced pressure until a residue of about 45 gms. remains, which is diluted with a mixture of 70 gms. of xylene and 30 gms. of nitrobenzene, mixed with 120 gms. of ground calcium hydroxide and heated with stirring at 125° C. for 10-15 minutes. After adding 50 ml. of water and 5 gms. of sodium carbonate to the separated solution, the solvents are removed by distilling with steam. The residue contains 7-dehydro-cholesterol acetate, which solidifies on cooling and is isolated as such or saponified with potassium hydroxide in alcoholic solution. In the usual manner the saponified product is worked up and the 7-dehydrocholesterol crystallised from ether-methyl alcohol. 20 gms. of 7-dehydro-cholesterol is obtained, representing a yield of 80%.

2. A solution of 14 gms. of cholesterol acetate in 35 ml. of dry ether and 0.3 ml. of cyclohexene is warmed refluxing with 9 gms. of N-bromosuccinimide for 20 minutes. The separated solution is concentrated, the residue of about 22 gms. diluted with 35 gms. of xylene and 15 gms. of nitrobenzene and after addition of 80 gms. of finely divided barium hydroxide (containing about 1 mol. of water of crystallisation) heated with vigorous stirring for 10 minutes at 105° to 110° C. During the heating, evaporation of some water, originating from the hydrated barium hydroxide, takes place. (Although it is preferable to carry out the reaction in the absence of water, this example illustrates the use of barium hydroxide, as such.) To the separated orange solution 30 ml. of water and 3 gms. of sodium carbonate is added and distilled with steam. The residue is hydrolysed with potassium hydroxide in ethanol solution and worked up as usual. 8.25 gms. of crystalline 7-dehydro-cholesterol is obtained.

3. 11.6 gms. of cholesterol propionate dissolved in 50 ml. of petroleum ether (B. Pt. 60/80° C.) and 0.4 ml. of cyclohexene is brominated with a mixture of 10 gms. of N-bromophthalimide and 3 gms. of barium oxide, previously ground together, by refluxing with stirring for 8 minutes. After concentrating the separated solution at 30° C. under reduced pressure, the slightly orange residue (16 gms.) is diluted with 25 gms. of xylene and 10 gms. of nitrobenzene and treated with 50 gms. of ground calcium hydroxide for 10 minutes at 125° C. with stirring. The solution, worked up as described in Example 2, yielded 8 gms. of 7-dehydro-cholesterol.

4. 42.8 gms. of cholesterol acetate, 200 ml. of petroleum ether (B. Pt. 60/80° C.), 5 gms. of ground calcium oxide and 25 gms. of N-bromosuccinimide were warmed and stirred with refluxing for 10 minutes. The slightly yellow solution was separated and after adding 1 ml. of pyridine the solvent was removed at room temperature under reduced pressure until 60 gms. of thick oily residue were obtained. This was dissolved in 10 ml. of acetone, the solvent removed at reduced pressure, and after renewed digestion of the residue with 15 ml. of acetone and thoroughly removing the solvent as before at 25° C., 53 gms. of a very thick residue remained, which on digestion with 20 ml. of acetone soon became crystalline, particularly if seeded with crystals obtained from a previous lot by a similar treatment. Crystallisation of the 7-bromo-cholesterol acetate increased rapidly on standing for 15 minutes. The thick crystalline mass was then diluted with a further 10 ml. of acetone and cooled for 15 minutes with ice. After again thoroughly removing the solvent at reduced pressure, 52 gms. of a slightly yellow crystalline residue was obtained, which after digesting with some ice cold acetone, filtering and washing and drying in vacuum, yielded 38 gms. of the 7-bromo-compound.

7-bromo-cholesterol acetate forms colourless crystals (M. Pt. 84–85° C.) easily soluble in ether, carbon tetrachloride and hydrocarbon solvents, it is very sensitive to acids and decomposes immediately with ethanol and water. Such a solution in ethanol shows after dilution with water volumetrically an amount of hydrobromic acid as calculated for a monobromo-cholesterol acetate.

5. 33 gms. of 7-bromo-cholesterol acetate were dissolved in 70 gms. of xylene and 30 gms. of nitrobenzene, mixed with 120 gms. of ground calcium hydroxide and heated with stirring for 15 minutes at 125° C. (inside temperature). Allowed to cool, a solution separated and after the addition of 5 gms. of sodium carbonate and 50 ml. of water, the organic solvents were removed by distilling with steam. 7-dehydro-cholesterol acetate solidified in the residue on cooling and was isolated as such or saponified and worked up as described in Example 1. 21.5 gms. of 7-dehydro-cholesterol was obtained, representing a yield of 86%.

While the invention has been more particularly described with reference to the use of cholesterol esters and of N-bromosuccinimide or N-bromophthalimide in the first stage of the process and to the application of cyclohexene as an activator and an oxide or hydroxide of calcium and/or barium hydroxide as an inorganic base in the second, dehydro-brominating stage of the process, I wish it to be understood that the invention is not so limited. Thus it may be applied to other esters or derivatives of cholesterol or other sterols and also to steroids having a double bond in the 5,6-position and a hydroxyl group in the 3-position of the cyclopentano-hydro-phenanthrene skeleton, further to other N-halogenated acid amides or imides. Instead of cyclohexene other unsaturated organic compounds may be used to activate the described halogenation, selected within the wide range of such compounds, which are suitable, due to their own reactivity with a N-halogenated acid imide, to propagate the halogenation of steroids. In a similar sense other basic adsorbents may be applied during the stage of halogenation. Furthermore, the process of dehydrohalogenation of a 7-halogeno-derivative of a steroid may be effected with another suitable inorganic base with or without the application of an organic nitro-compound to facilitate the reaction. In addition, other solvents, diluents and agents and mixtures of them may be used and conditions of the process varied as to the range of temperature, proportions, necessity of agitation of mixtures, etc., without departing from the spirit and scope of this invention.

I claim:

1. A process for the manufacture of 7-halogeno-steroids which comprises halogenating a substance selected from the group of 5,6-unsaturated sterols and esters thereof by treatment with a halogenating agent selected from the group consisting of N-halogenated acid imides and N-halogenated acid amides in an inert solvent in the presence of cyclohexene.

2. A process for the manufacture of 7-bromo-cholesterol esters which comprises brominating a cholesterol-3-ester by treatment with a halogenating agent selected from the group consisting of N-brominated acid imides and N-brominated acid amides in an inert solvent in the presence of cyclohexene.

3. A process for the manufacture of 7-bromo-cholesterol esters which comprises brominating a cholesterol-3-ester by treatment with N-bromosuccinimide in an inert solvent in the presence of cyclohexene.

4. A process for the manufacture of 7-bromo-cholesterol acetate which comprises brominating cholesterol acetate by treatment with N-bromosuccinimide in an inert solvent in the presence of cyclohexene.

5. A process for the manufacture of 7-bromo-cholesterol esters which comprises brominating a cholesterol ester by treatment with a N-halogenated acid imide in an inert solvent in the presence of cyclohexene and a basic adsorbent selected from the group of alkaline earth metal oxides and hydroxides.

6. In a process for the manufacture of 7-dehydro-derivatives of a substance selected from the group consisting of 5,6-unsaturated sterols and esters thereof the step of reacting a solution of a 5,6-unsaturated 7-halogeno-steroid with an inorganic base selected from the group of alkaline earth metal oxides and hydroxides.

7. In a process for the manufacture of 7-dehydro-derivatives of a substance selected from the group of 5,6-unsaturated sterols and esters thereof the step of reacting a solution of a 5,6-unsaturated 7-halogeno-steroid with an alkaline earth metal base.

8. In a process for the manufacture of 7-dehydro-cholesterol esters the step of reacting a solution of a 7-bromo-cholesterol ester with an alkaline earth metal base.

9. In a process for the manufacture of 7-dehydro-cholesterol esters, the step of reacting a solution of a 7-bromo-cholesterol ester with an alkaline earth metal base in the presence of nitrobenzene.

10. In a process for the manufacture of 7-dehydro-cholesterol esters the step of reacting a solution of a 7-bromo-cholesterol ester with an alkaline earth metal base in the presence of nitrobenzene.

11. In a process for the manufacture of 7-dehydro-cholesterol acetate the step of reacting a solution of 7-bromo-cholesterol acetate with calcium hydroxide.

12. In a process for the manufacture of 7-dehydro-cholesterol acetate the step of heating a solution of 7-bromo-cholesterol acetate in xylene and nitrobenzene with ground calcium hydroxide.

13. A process for the manufacture of a 7-dehydro-cholesterol ester which comprises brominating a cholesterol-3-ester by treatment with a N-brominated acid imide in an inert solvent in the presence of cyclohexene, removing a part of the inert solvent, diluting the residue with nitrobenzene and xylene, heating the solution thus obtained with ground calcium hydroxide and removing the solvents by steam distillation.

14. A process for the manufacture of 7-dehydro-cholesterol which comprises brominating cholesterol acetate by treatment with N-bromo-succinimide in petroleum ether in the presence of cyclohexene, removing a part of the petroleum ether, diluting the residue with nitrobenzene and xylene, heating the solution thus obtained with ground calcium hydroxide, removing the solvents by steam distillation and saponifying the product.

ALBERT LOWENBEIN.

REFERENCES CITED

The following references are of record in the file of this patent:

UNITED STATES PATENTS

| Number | Name | Date |
|---|---|---|
| 2,340,388 | Inhoffen | Feb. 1, 1944 |

FOREIGN PATENTS

| Number | Country | Date |
|---|---|---|
| 574,432 | Great Britain | Jan. 4, 1946 |

OTHER REFERENCES

Ziegler, Annalen, 551, 102 (1942).